Figure 6:
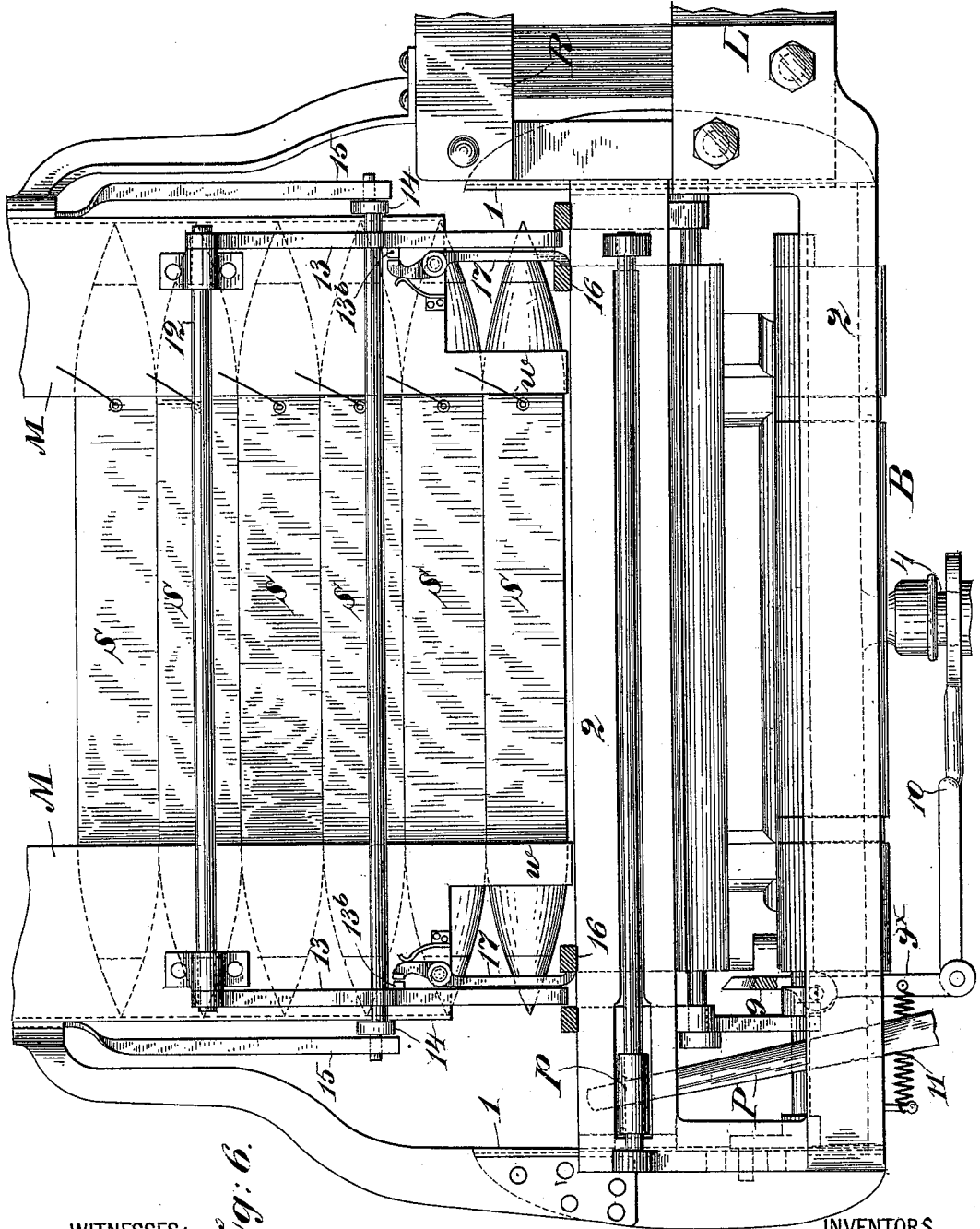

No. 636,704. Patented Nov. 7, 1899.
W. H. BAKER & F. E. KIP.
LOOM.
(Application filed July 8, 1899.)
(No Model.) 5 Sheets—Sheet 1.
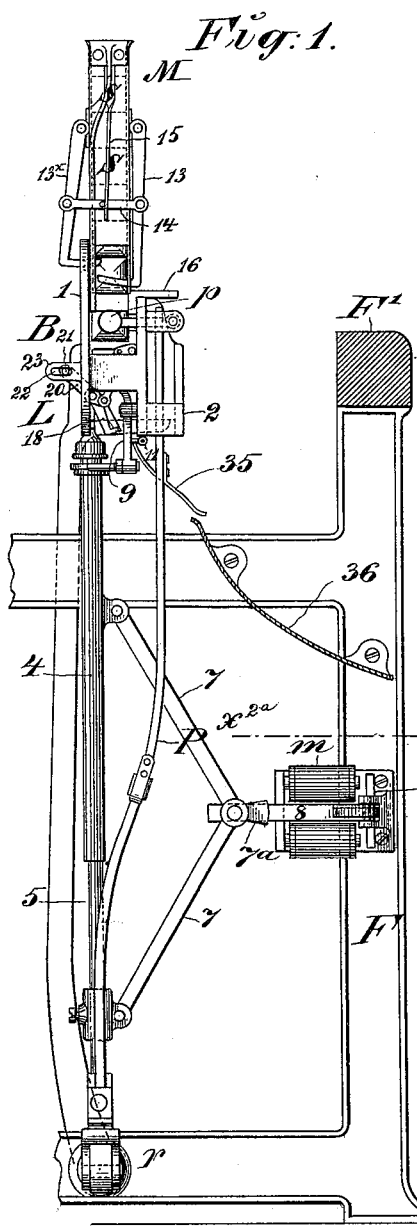
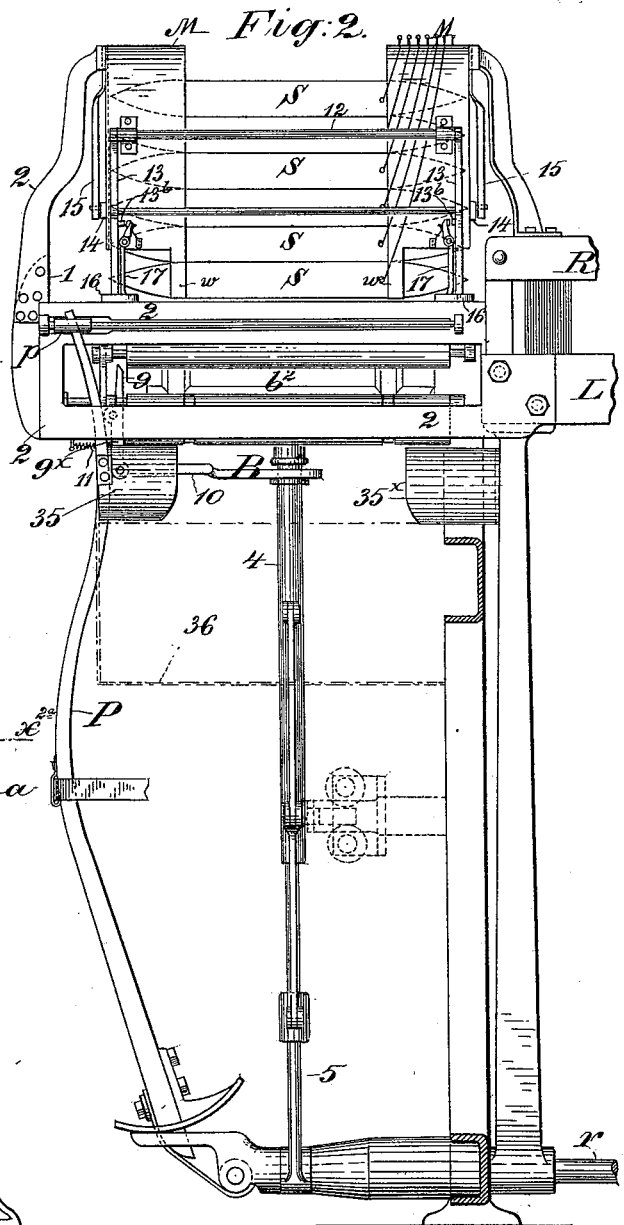
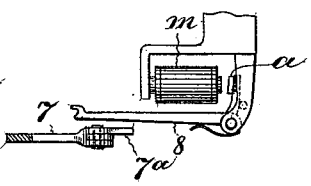
WITNESSES: INVENTORS
William H. Baker
Frederic E. Kip.
BY
ATTORNEY
THE NORRIS PETERS CO., PHOTO-LITHO., WASHINGTON, D. C.

No. 636,704. Patented Nov. 7, 1899.
W. H. BAKER & F. E. KIP.
LOOM.
(Application filed July 8, 1899.)
(No Model.) 5 Sheets—Sheet 2.
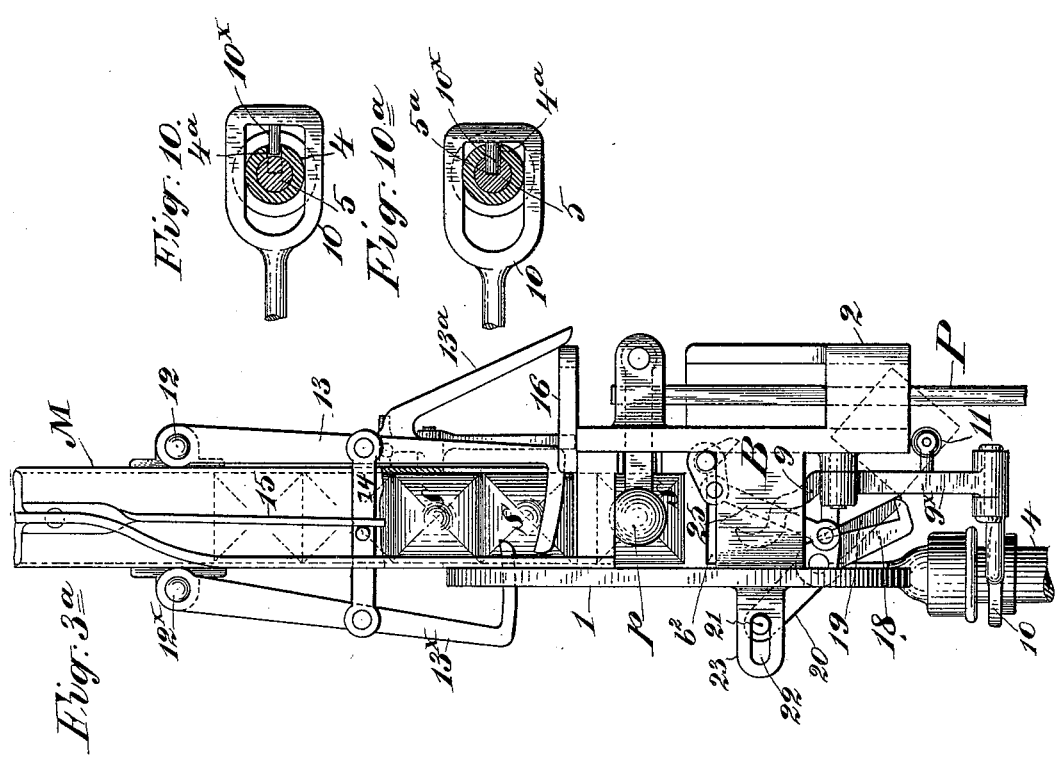
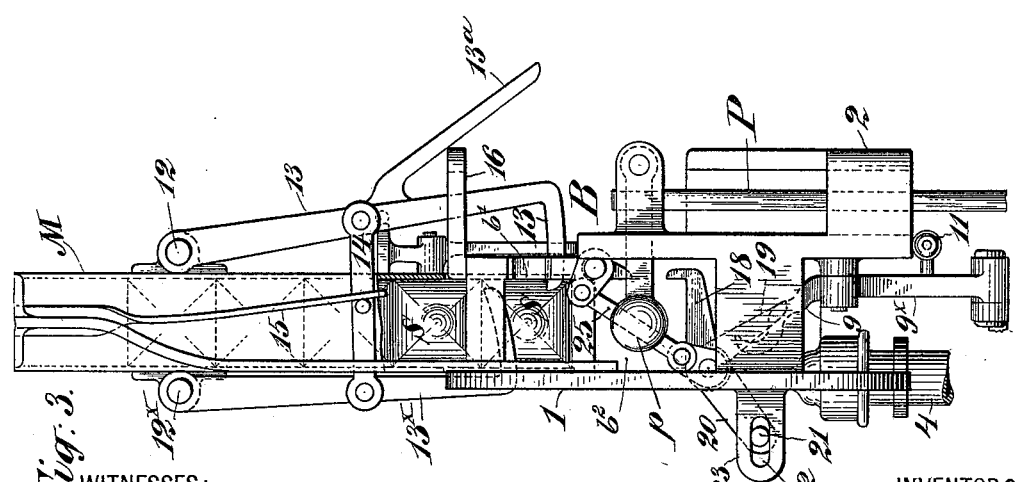
WITNESSES:
INVENTORS
William H. Baker
Frederic E. Kip
BY
Henry Connett
ATTORNEY No. 636,704. Patented Nov. 7, 1899.
W. H. BAKER & F. E. KIP.
LOOM.
(Application filed July 8, 1899.)
(No Model.) 5 Sheets—Sheet 3.
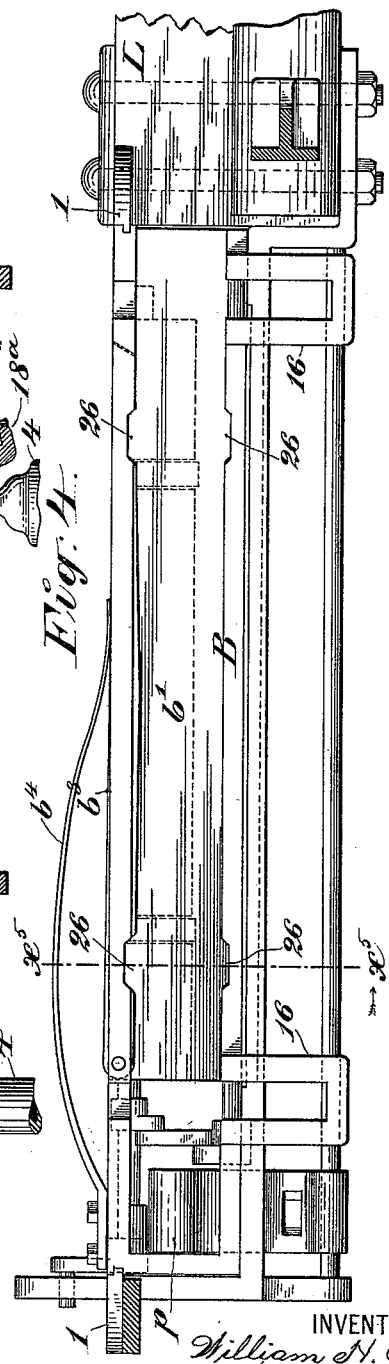
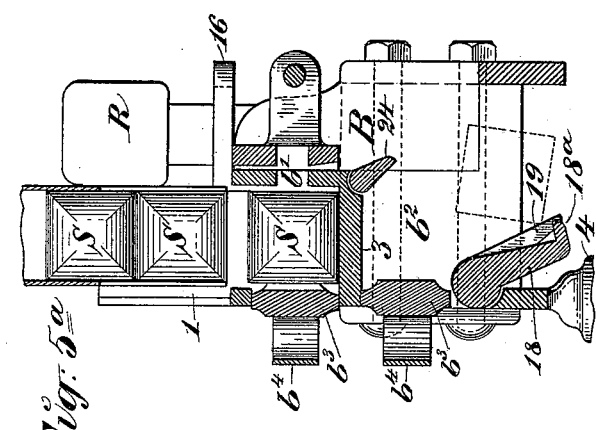
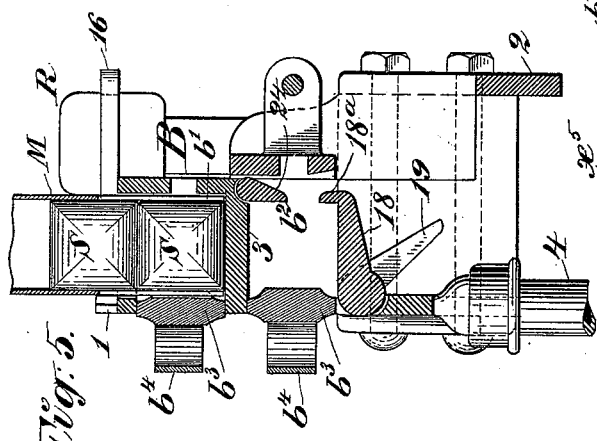
WITNESSES:
J. H. Hinman
Peter N. Ross
INVENTORS
William H. Baker
Frederic E. Kip
BY
Henry Connett
ATTORNEY No. 636,704. Patented Nov. 7, 1899.
W. H. BAKER & F. E. KIP.
LOOM.
(Application filed July 8, 1899.)
(No Model.) 5 Sheets—Sheet 4.

WITNESSES:
INVENTORS
William H. Baker
Frederic E. Kip
BY
Henry Connett
ATTORNEY

No. 636,704. Patented Nov. 7, 1899.
W. H. BAKER & F. E. KIP.
LOOM.
(Application filed July 8, 1899.)
(No Model.) 5 Sheets—Sheet 5.
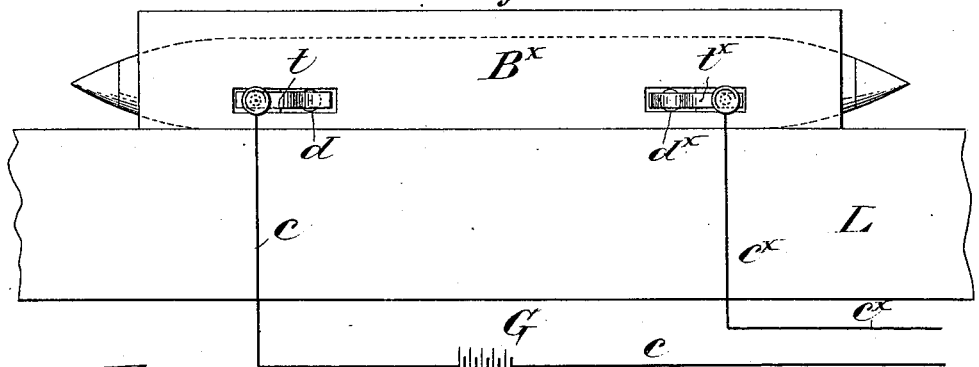
Fig. 7.
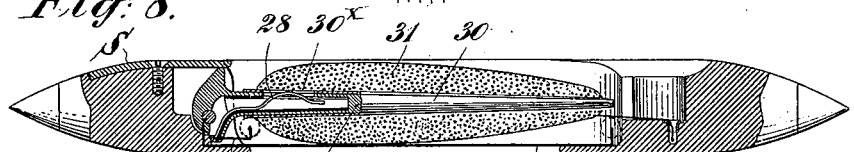
Fig. 8.
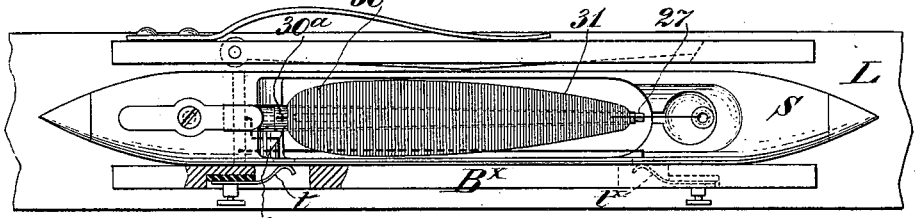
Fig. 9.
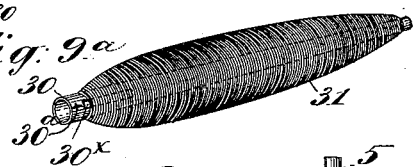
Fig. 9ª.
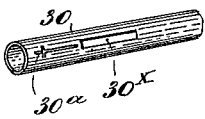
Fig. 9ᵇ.
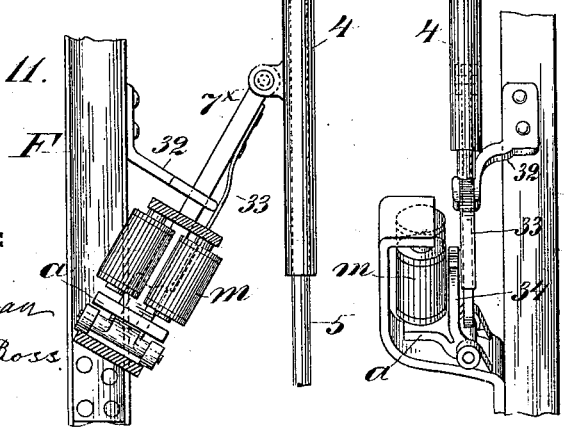
Fig. 11. Fig. 12.
WITNESSES:
J. W. Kliman
Peter A. Ross
INVENTORS
William H. Baker
Frederic E. Kip
BY Henry Connett
ATTORNEY

UNITED STATES PATENT OFFICE.

WILLIAM H. BAKER, OF CENTRAL FALLS, RHODE ISLAND, AND FREDERIC E. KIP, OF MONTCLAIR, NEW JERSEY.

LOOM.

SPECIFICATION forming part of Letters Patent No. 636,704, dated November 7, 1899.

Application filed July 8, 1899. Serial No. 723,128. (No model.)

*To all whom it may concern:*

Be it known that we, WILLIAM H. BAKER, residing at Central Falls, Providence county, Rhode Island, and FREDERIC E. KIP, residing at Montclair, Essex county, New Jersey, citizens of the United States, have invented certain new and useful Improvements in Looms, of which the following is a specification.

This invention relates to that class of looms wherein weft is supplied automatically as it is taken up in the weaving, and the weft-supplying mechanism belongs to the class in which filled shuttles are supplied as needed, electricity being employed to announce the exhaustion of the supply in the shuttle and to control the operation of the supplying mechanism. In this loom the filled shuttles are superposed in a magazine which is mounted on and vibrates with the batten or lay, and a two-celled or compound shuttle-box, also carried by the lay under said magazine, is adapted to be elevated to take a shuttle from the magazine. While thus elevated, the lay moves back to the picking-point and the exhausted shuttle is shot from the opposite side of the loom into the lower cell of the compound box, which latter then falls, opening the lower cell and discharging the exhausted shuttle therefrom and bringing the compound box down until the full shuttle in the upper or working cell thereof is alined with the picker.

One important feature of the invention is the means employed for taking the shuttle from the magazine on the lay into the upper or working cell of the shifting shuttle-box. another is the means employed for elevating and supporting the shuttle-box, and another is the construction of the lower cell and the means employed for discharging the exhausted shuttle.

In the accompanying drawings, which serve to illustrate an embodiment of the invention, Figure 1 is a side elevation of a part of a loom, showing the lay or batten and the weft-supply mechanism in end elevation. Fig. 2 is a side elevation of the same mechanism seen from the right in Fig. 1, the breast-beam being broken away; and Fig. 2ª is a sectional plan of the magnet and toggle mechanism taken at $x^{2a}$ in Fig. 1. These views are on the same relatively small scale. Figs. 3 and 3ª are similar end views of the magazine and shifting shuttle-box, the former showing the box in its elevated position receiving a shuttle from the magazine and the latter showing the box in its normal depressed position. Fig. 4 is a plan of the shifting shuttle-box. Figs. 5 and 5ª are vertical transverse sectional views of the shifting shuttle-box, taken at $x^5$ in Fig. 4, the former showing the box elevated and the latter showing it depressed or in its normal position. Fig. 6 is a side elevation of the shifting shuttle-box and a part of the magazine. Fig. 7 is a side elevation of the ordinary shuttle-box on the lay at the opposite side of the loom from the magazine, showing the electrical contacts thereon and the exterior operating-circuit. Fig. 8 is a vertical longitudinal section of the shuttle, and Fig. 9 is a plan of the same. These views show the circuit in the shuttle and the break therein adapted to be closed by the exhaustion of the weft. Fig. 9ª shows the cop detached, and Fig. 9ᵇ shows a part of the cop-tube with its slot and marking. Figs. 10 and 10ª are detail views of the device for supporting the shifting compound shuttle-box when elevated. Figs. 11 and 12 illustrate a modification of the lifting device for the compound shuttle-box.

F represents the loom-frame in general, and F' the breast-beam thereof. L is the lay carrying the reed R and turning in its vibrations with the swing-rail $r$ below. P is the picker-stick, and $p$ the picker. All of these parts may be of some one of the usual constructions, and those which move may be operated by the means commonly employed for the purpose.

The shuttles S may be, in general, constructed and fitted up in a known way.

B represents, in general, the compound two-celled shifting shuttle-box, and B˟ the ordinary shuttle-box, Fig. 7, at the opposite side of the loom.

On the lay L, at the same side with the shuttle-box B, is mounted an upright shuttle holder or magazine M, and directly under this magazine, in suitable guides 1 in a bracket 2 on the lay, is the shifting compound shuttle-box B. This box is mounted to slide up and down in the guides 1 in the fixed bracket 2 to an extent sufficient to bring either of its two cells in alinement with the shuttle-race and picker, and it comprises the two cells $b'$ and $b^2$, separated by a bottom 3.

For the better understanding of the operation of the invention we will first describe the means for operating the shifting shuttle-box, for retaining it elevated for a time, for tripping the box so that it may descend again at the proper time, for taking in the fresh shuttle from the magazine, and for discharging the exhausted shuttle.

The shuttle-box B is mounted on a tubular sleeve 4, which slides telescopically on an upright rod or stem 5, which is attached at its lower end to the swing-rail $r$, which carries the lay. Normally the shuttle-box B is depressed, as seen in Figs. $3^a$ and $5^a$, and to elevate it any suitable device may be employed. That shown in the principal views comprises a toggle 7, the upper link of which is hinged to the sleeve 4 and the lower link to the rod 5. As the lay vibrates the toggle also vibrates, and normally its knuckle $7^a$ plays in a path close to the armature-lever 8 of an electromagnet $m$, mounted on the frame of the loom and having its armature $a$ fixed to one arm of the lever 8. When the magnet $m$ is excited, it attracts its armature and thus throws the other arm of its lever, Fig. $2^a$, into the path of the knuckle of the toggle, so that as the lay beats up to the position seen in Fig. 1 the knuckle of the toggle will impinge upon the end of the armature and straighten the toggle, thus elevating the shuttle-box. When the box reaches its highest elevation, a spring latch device is employed to support it in its elevated position, and while any similar device may be employed the one illustrated will now be described.

An upright tripping-lever is fulcrumed in the shuttle-box B, near its outer end, its upper arm 9 being so situated in the lower cell $b^2$ thereof that when the exhausted shuttle enters this cell from the opposite side of the loom the said shuttle will impinge upon and press back said arm. The lower arm $9^\times$ of said lever is coupled to a latch-slide 10, which is best illustrated in Figs. 10 and $10^a$. This slide embraces the stem 4 and is guided thereon, and it has a bolt or latch-stud $10^\times$, which normally occupies an aperture $4^a$ in the stem 4 and bears on the surface of the rod 5, as seen in Fig. 10. This is when the box B is depressed; but when said box is elevated to its extreme height a bolt-socket $5^a$ in the rod 5 is brought into register with the latch-stud $10^\times$, and the latter is shot into said socket by the light spring 11. (Seen in Fig. 6.) Any suitably-arranged spring may be employed for this purpose. The bolt or stud $10^\times$ now holds the box B elevated until the exhausted shuttle enters, when the latter by impinging upon the upper arm 9 of the tripping-lever drives out the bolt and allows the box to fall.

While the shuttles are in general superposed in the magazine M and rest on one another, the lowermost or bottom shuttle is separated from those above it by a mechanism in the nature of an escapement, which will now be described in connection with the operation of taking a fresh shuttle from the magazine into the upper working cell $b'$ of the box B.

On the respective sides of the magazine M are mounted rock-shafts 12 and $12^\times$. To the respective ends of the shaft 12 are fixed two like pendent hooks 13, which under normal conditions take under the bottom shuttle in the magazine, as seen in Fig. $3^a$, at the tapered ends of the shuttle and support the latter. To the respective ends of the shaft $12^\times$ are fixed two hooks $13^\times$, similar to the hooks 13, but shorter and adapted to take under the respective ends of the next shuttle above the bottom one in the magazine. The pairs of hooks 13 and $13^\times$ are connected by rigid links 14, so that when the pair 13 is held in under the bottom shuttle by a spring or springs 15, as seen in Fig. $3^a$, the other pair $13^\times$ will be pressed back out of play or engagement.

Normally all the shuttles in the magazine rest on the bottom shuttle and it rests on the hooks 13; but when the shuttle-box B is elevated two lateral projections 16 on the box take under rigid arms $13^a$ on the hooks 13 and as the box rises press back or outward the said hooks, so as to free the bottom shuttle as the working cell $b'$ rises to embrace and take it in. At the same time the pair of hooks $13^\times$ advance and take under the shuttle next above, the parts then assuming the positions seen in Fig. 3. When the box B is elevated, the hooks 13 and $13^\times$ are held in the position seen in Fig. 3 by a detent device, so that when the box descends again they may not be shifted too quickly by the springs 15. Any suitable device may be employed, but that shown will now be described.

On the side of the magazine is fulcrumed a spring detent-lever 17, the upper end of which takes behind a stud $13^b$ on the hook 13 when the box B is elevated and prevents the hook from returning; but when the box descends and nears its lowest point the projection 16 wipes over an inclined projection on the lower arm of the detent-lever 17, and by rocking said lever presses back its upper arm out of engagement with the hook 13, thus freeing the latter. Preferably there will be two of these detents, one at each hook 13, and two are shown in Fig. 6.

While the box B is elevated the lay recedes to the picking-point and the exhausted shuttle is shot across and enters the lower cell $b^2$ of the box. As it enters this cell its end impinges on the tripping-lever 9, thus releasing the box and allowing it to fall, as before explained. When the box descends, the hinged bottom 18 of the lower cell $b^2$ falls and allows the exhausted shuttle to fall out, as indicated in Figs. $3^a$ and $5^a$. This bottom 18 has a flange $18^a$ at its free edge, which forms a part of the side of the cell $b^2$, Fig. 5, when the box B is elevated, and in order to prevent the falling shuttle from catching or lodging on this flange fixed guards or shields 19 are provided on the shuttle-box as skids to carry the shuttle over said flange. The means for automatically operating this hinged bottom 18 is best seen in Figs. 3 and $3^a$. Extending from the hinged edge of the bottom is a crank-arm 20, which carries a stud 21, that engages a horizontally-extending keeper-slot 22 in a lug 23 on the bracket 2. The operation is clearly illustrated in the drawings. As the slotted lug 23 is stationary, when the shuttle-box is depressed the engagement of the stud therewith causes the bottom 18 to turn about its hinged edge and open, as will be readily understood. When the box is elevated, the bottom will be again closed. In order to still better inclose the cell $b^2$ at the side next the picker-stick when the box B is elevated, there may be another hinged plate 24, adapted to be closed and opened conjointly with the bottom 18 by means of a connecting-link 25. (Seen clearly in Fig. 3.) In the construction shown the hinged bottom 18 and plate 24 have journals at their ends, and the crank-arm 20, as well as the short arms to which the ends of the link 25 are coupled, are fixed on the respective journals and not directly to the parts 18 and 24.

It will be noted, by inspection of Fig. 6 especially, that the magazine M has at its lower edge pendent side guides $w$, and when the shuttle-box B rises these enter the upper cell thereof, at recesses 26, Fig. 4, in the sides thereof, thus serving to guide the bottom shuttle into said cell. The box will have or may have the usual swells $b^3$ and springs $b^4$.

We will now explain the means whereby the entry of the exhausted shuttle into the shuttle-box $B^x$, Fig. 7, at the side of the loom opposite to the magazine and box B announces electrically the requirement for a filled shuttle and closes the operating-circuit which controls the supply mechanism.

On the box $B^x$ are two spring-terminals $t$ and $t^x$, which when a shuttle S enters said box are put into electrical contact, respectively, with two terminal plates or disks $d$ and $d^x$ on the shuttle. The springs $t$ and $t^x$ are terminals of a main outer circuit, consisting of the conductors $c$ and $c^x$ and including the magnet $m$ and generator G. In the shuttle is a partial or interior circuit, of which the terminals are the disks $d$ and $d^x$, and this interior circuit has in it a break adapted to close automatically when the weft or filling is exhausted, or nearly so, and which is held open by the overwrapped filling or weft on the weft-holder in the shuttle. In our several pending applications—namely, Serial No. 711,026, filed March 29, 1899; Serial No. 707,722, filed March 4, 1899, and Serial No. 721,802, filed June 26, 1899—we have shown different arrangements of the circuit in the weft-holder, and either of these may be employed in the present case. The means employed herein will now be described with especial reference to Figs. 8, 9, and $9^a$. The metal spindle 27 is hinged in the shuttle in a known way, and in a hollow recess of same is mounted an insulated spring-terminal 28, the bow or arch of which tends normally, Fig. 8, to project outwardly through a slot in the side of the spindle, while the free end of said terminal is pressed into elastic contact with the metal spindle itself. This terminal is electrically connected by a suitable conductor 29 with the plate $d$ on the shuttle, and the metal spindle is connected by a suitable conductor $29^x$ with the plate $d^x$ on the shuttle. The cop (seen detached in Fig. $9^a$) comprises a tube 30, of paper or the like, and the weft or filling 31 wound thereon. The tube 30 fits snugly on the spindle 27 and has in it a slot $30^x$, which registers with the slot in the spindle when the cop is in place, whereby the bow or arch of the terminal 28 bears on the weft-thread of the cop, which thus overwraps it and serves to hold the free end of the terminal out of electrical contact with the spindle, as seen in Fig. 8. However, when the weft is nearly exhausted the pressure is removed from the spring-terminal 28 and it springs out into contact with the spindle, so that when the shuttle enters the box $B^x$ the circuit through the magnet $m$ will be completed.

The cop illustrated in Fig. $9^a$ is not of itself novel, but providing the aperture $30^x$ in the tube 30 thereof is novel, so far as we are aware; but the cop-tube, with the aperture in its side, is not specifically claimed in this application, it being matter for a separate application. In Fig. 9 the weft is shown as wholly covering the slot $30^x$, and in Fig. $9^a$ it is represented as only partially covering the same. This is not important to our invention so long as the weft overwraps or takes over the protruding arch or bow of the terminal 28.

In winding the weft on the cop-tube it may sometimes be desirable to wholly cover the slot $30^x$ therein, and in that case the weaver would have no convenient guide in slipping the cop on the spindle 27 for putting said slot in register with the terminal 28, and to provide such a guide we prefer to put a mark $30^a$ on the exposed part of the tube to serve as a guide. This mark may conveniently be alined with the slot $30^x$, and it may be printed or impressed on the tube in any convenient way.

It may be said here that while the bottom shuttle in the magazine is expected to enter the upper cell of the rising shuttle-box freely it is possible that it might be pushed upward if no means were employed to prevent it. In the construction described for segregating the bottom shuttle it will be noted that when the shuttle-box is moved upward, as in Fig. 3, to take in the shuttle the hooks $13^x$ interpose between the lower or bottom shuttle and that next above and not only support the latter, but prevent the former from being pushed upward. Thus the hooks 13× serve a double purpose.

Figs. 11 and 12 are views taken one from the side and the other from the rear of a slight modification of the lifter for the shuttle-box B. In this construction an arm 7×, hinged at its upper end to the tubular stem 4, rests in a hook-like guide 32 on the frame F and has a keeper-spring 33 to keep it from getting out of the guide. When the armature a of the magnet m is attracted, it throws the arm 34 of the hinged armature-lever out into the path of the end of the arm 7×, and this latter impinges on the arm 34 in beating up, and thus lifts the box B×. The lifting device may obviously be varied and modified to a considerable extent without departing from our invention.

In Figs. 1 and 2 a chute is illustrated for leading off the exhausted shuttles. This chute comprises two curved guides 35 and 35×, one on the picker-stick P and the other on the sword L× of the lay. The shuttle falling sidewise from the box B falls onto these guides or skids and is led into a stationary chute 36 on the frame of the loom. When the shuttle is discharged, the picker and lay will be in substantially the position seen in Figs. 1 and 2.

One of the more important features of this invention is the construction wherein the spindle of the shuttle, which is adapted to carry an apertured cop-tube, also carries the circuit-closing device within the shuttle, and this construction is not limited to the particular weft-supplying mechanism herein shown, being as well adapted to controlling the times of operation of other weft-supplying mechanisms.

Having thus described our invention, we claim—

1. A weft-supplying mechanism for looms, having a shuttle-magazine mounted on the lay, a shiftable, celled, or compound shuttle-box also carried by the lay, mechanism for elevating said box when empty at proper times to take in a fresh shuttle from the magazine, means for supporting the box until it receives the shuttle from the opposite side, and an open electric circuit, including an electromagnet, and controlling said elevating mechanism, said circuit having in it a break controlled by the weft in the shuttle.

2. In a weft-supply mechanism for looms, the combination with a magazine carried by the lay, and means for segregating the bottom shuttle in the magazine at the proper moment, of the compound or celled shuttle-box adapted to move up under said magazine and receive therefrom the segregated shuttle, mechanism for elevating said box, and electrical means for controlling the lifting mechanism of the box, said electrical means being operated from the shuttle-box at the opposite side of the loom from the magazine.

3. In a weft-supplying mechanism for looms, the combination with the magazine carried by the lay, of the shifting, compound shuttle-box, means for lifting said box up to the magazine to receive a shuttle in its working cell, means for holding said box in its elevated position and supporting it, and means, actuated by the incoming shuttle from the opposite side, for removing said supporting device, whereby the box is allowed to descend, substantially as set forth.

4. The combination with the magazine and the compound shuttle-box below and adapted to be moved up under the magazine for receiving the bottom shuttle therefrom, of mechanism for elevating said box, and a segregating mechanism on the magazine, said mechanism comprising the connected pairs of swinging hooks, 13 and 13×, means carried by the shuttle-box for swinging said hooks to free the bottom shuttle, and means for retracting said hooks when the shuttle-box descends.

5. The combination with the magazine and shifting shuttle-box, the latter provided with projecting parts 16, of the segregating device on the magazine, said device comprising the connected pairs of swinging hooks, 13 and 13×, the spring or springs for retracting said hooks when freed, means substantially as described for retaining the segregating device in its shifted position until the box shall have descended part way, and means, carried by the box, for shifting the segregating hooks and for releasing them.

6. The combination with the lay, and the bracket thereon having guides for the shuttle-box B, of the said box, having an upper cell $b^3$, and a lower cell $b^2$, and having the hinged bottom, 18, of the lower cell provided with an arm 20 and stud 21, said stud engaging a slot or keeper 22 in a lug on the bracket, whereby said bottom is operated by the movements of the box, substantially as set forth.

7. The combination with the lay, and the bracket thereon having guides for the shuttle-box B, and a slot or keeper 22, of the said shuttle-box, having an upper and lower cell, and having a hinged bottom and hinged side for the lower cell, of means substantially as described for throwing open said bottom and side when the box descends, as set forth.

8. The combination with the lay, the bracket 2 fixed thereon, and the shuttle-box B mounted to slide in said bracket, of the means for opening the lower cell for the discharge of the exhausted shuttle, said means comprising the following instrumentalities, namely: the slotted lug 23, the hinged bottom 18 of the lower cell, provided with an arm 20, and a stud 21, engaging the slot in said lug, the hinged side 24, and the connecting means between the bottom 18 and side 24, whereby they both operate simultaneously, substantially as set forth.

9. The combination with a shuttle-box adapted to be elevated, the guide-rod 5, the tubular stem 4 on the box and embracing said rod, and means for elevating the box, of the supporting and tripping device, comprising the lever 9, 9ˣ, extending into the path of the shuttle entering the box, the spring 11, and the latch-slide 10, having a bolt 10ˣ, adapted to enter coincident holes in the said rod and stem, substantially as set forth.

10. The combination with the loom-frame, of the magnet mounted thereon, its armature, armature-lever and spring, of the lay, the shifting shuttle-box mounted in guides on the lay, and the toggle for lifting said box, said armature-lever being adapted to move into the path traversed by the knuckle of said toggle when said magnet is excited, substantially as set forth.

11. In a loom, the chute for the discharged shuttle, comprising the plate 35, mounted on the picker-stick, and the plate 35ˣ, mounted on the lay-sword, and substantially alined with the plate 35, substantially as set forth.

12. The combination with the spindle of the shuttle, having a hollow recess therein, and a spring circuit-terminal in said hollow recess which projects outwardly through a slot in said spindle, of the cop, having a tube of thin material provided with a slot adapted to register with that in the spindle when in place on the latter, substantially as set forth.

13. The combination with the spindle of the shuttle, having an outwardly-curved, spring circuit-terminal, the curved portion of which projects from the surface of the spindle, of a cop to fit on said spindle, said cop having in it a tube provided with a slot adapted to register with the curved projecting part of said contact when the cop is on the spindle, whereby the weft of the cop is brought to bear on said terminal, substantially as and for the purpose set forth.

14. Weft-supply mechanism, comprising mechanism for supplying filled weft-carriers as required, to a loom, of an electric circuit and mechanism controlling said supply mechanism, said circuit including a generator and having a break which is closed by the entry of a shuttle into the shuttle-box, and the shuttles each having in it an electric circuit which closes with the exterior circuit when the shuttle is in place in the shuttle-box, said shuttle having in it a spindle provided with a circuit-closing device having an outwardly-curved spring-terminal, the curved portion of which projects from the surface of the spindle, and a cop-tube-carrying weft, said cop-tube having in it an aperture so situated as to register with said curved portion of the terminal when said tube is on the spindle, substantially as and for the purpose set forth.

15. In a loom having a weft-supply mechanism, the combination with mechanism for supplying filled weft-carriers as required, to a loom, of an electric circuit and mechanism controlling said supply mechanism, said circuit including a generator, a magnet, a shuttle having in it a partial electric circuit and a spindle having in it a hollow or recess, an automatic circuit-closer in said hollow or recess in the spindle, said circuit-closer having an outwardly-curved spring-terminal which projects from said hollow or recess, and a cop-tube having in it an aperture so situated as to register with the projecting part of said terminal when said tube is on the spindle, substantially as and for the purpose set forth.

16. In a loom having a weft-supply mechanism, the combination with said weft-supply mechanism, of means for controlling the time of its operation comprising an electrically-actuated device having its circuit extending through the shuttle and having a circuit maker and breaker attached to the spindle of the shuttle, and so situated as to be within the weft, and a cop-tube, which carries the weft, having in it an aperture so situated as to register with the projecting portion of one of the terminals of said circuit maker and breaker when the tube is on the spindle, substantially as and for the purpose set forth.

17. In a loom having a weft-supply mechanism, the combination with said weft-supply mechanism and means for controlling the time of its operation, said means consisting of a generator and magnet connected with said weft-supply mechanism, of an electric circuit extending from the magnet to an automatic circuit-closing device attached to a spindle of a shuttle, and a cop-tube having in it an aperture which is adapted to register with a projecting and yielding part of said circuit-closing device, said circuit-closing device being adapted to be opened or closed, respectively, by the presence or absence of the weft carried by said cop-tube.

18. In a loom, the combination with a shuttle-magazine mounted on the lay, and a shiftable, celled or compound shuttle-box also carried by the lay, of means for shifting said box in order to take a fresh shuttle into its working cell and to bring the auxiliary cell into line with the race, and means for controlling the time of the operation thereof, said means comprising an electric circuit including a generator and having a break which is closed by the entry of a shuttle into the shuttle-box, and the shuttles, each having in it an electric circuit which closes with the exterior circuit when the shuttle is in place in the shuttle-box, said shuttle having in it a spindle provided with a circuit-closing device situated so as to be within the weft carried by the spindle.

19. In a loom, the combination with a shuttle-magazine mounted on the lay, and a shiftable, celled or compound shuttle-box also carried by the lay, of means for shifting said box in order to take a fresh shuttle into its working cell and to bring the auxiliary cell into line with the race, and means for controlling the time of the operation thereof, said means comprising an electric circuit including a generator, a magnet, and a shuttle having in it a partial electric circuit, and having in it also a spindle provided with a hollow or recess, said hollow or recess containing an automatic circuit-closing device consisting of two terminals, both contact-surfaces of which are situated wholly within said hollow or recess in the spindle.

20. In a loom, the combination with a shuttle-magazine mounted on the lay, and a shiftable, celled or compound shuttle-box also carried by the lay, of means for shifting said box in order to take a fresh shuttle into its working cell and to bring the auxiliary cell into line with the race, and means for controlling the time of the operation thereof comprising an electrically-actuated device having its circuit extending through the shuttle and having a circuit maker and breaker attached to the spindle of the shuttle and so situated as to be within the weft carried by said spindle.

21. In a loom, the combination with a shuttle-magazine mounted on the lay, and a shiftable, celled or compound shuttle-box also carried by the lay, of means for shifting said box in order to take a fresh shuttle into its working cell and to bring the auxiliary cell into line with the race, and means for controlling the time of the operation thereof, said means consisting of a generator and magnet, and an electric circuit extending from the magnet to an automatic circuit-closing device attached to a spindle of a shuttle, and said automatic circuit-closing device being adapted to be opened or closed, respectively, by the presence or absence of weft carried by said spindle.

In witness whereof we have hereunto signed our names, this 14th day of June, 1899, in the presence of two subscribing witnesses.

WILLIAM H. BAKER.
    FREDERIC E. KIP.

Witnesses:
 WILLIAM B. PHELPS,
 DAVID L. BOWERS.